(12) United States Patent
Kanamori et al.

(10) Patent No.: US 6,559,900 B1
(45) Date of Patent: May 6, 2003

(54) LENS SYSTEM FOR A PROJECTION DISPLAY APPARATUS IN WHICH LENSES ARE UNIFORM IN ONE DIRECTION AND NONUNIFORM IN ANOTHER

(75) Inventors: Tatsuru Kanamori, Saitama (JP); Makoto Shinoda, Tokyo (JP); Tohru Kawai, Kanagawa (JP); Kenji Sugihara, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/481,019

(22) Filed: Jan. 11, 2000

(30) Foreign Application Priority Data

Jan. 11, 1999 (JP) .......................................... 11-004015

(51) Int. Cl.$^7$ .......................................... G02F 1/1335
(52) U.S. Cl. .............................................. 349/5; 353/38
(58) Field of Search .............................. 349/5, 6, 7, 8, 349/9, 95; 353/38, 102

(56) References Cited

U.S. PATENT DOCUMENTS

| 5,098,184 A | | 3/1992 | van den Brandt et al. .. 353/102 |
| 5,278,680 A | * | 1/1994 | Karasawa et al. ............. 349/9 |
| 5,283,600 A | * | 2/1994 | Imai .......................... 353/34 |
| 5,359,455 A | * | 10/1994 | Oishi ........................... 349/9 |
| 5,418,583 A | * | 5/1995 | Masumoto .................... 353/38 |
| 5,662,401 A | * | 9/1997 | Shimizu et al. ............... 353/38 |
| 5,865,521 A | | 2/1999 | Hashizume et al. ........... 353/38 |
| 6,307,601 B1 | * | 10/2001 | Kakuda et al. ................. 349/5 |

FOREIGN PATENT DOCUMENTS

| EP | 0883302 | 12/1998 | ............ H04N/9/31 |
| JP | 08234205 | 9/1996 | ......... G02F/1/1335 |
| JP | 11249075 | 9/1999 | ........... G02B/27/28 |

* cited by examiner

Primary Examiner—Kenneth Parker
(74) Attorney, Agent, or Firm—Jay H. Maioli

(57) ABSTRACT

In a projection type display apparatus that projects an image by inputting a light beam emitted from a light source to a spatial light modulation device, it is intended to provide a lens array as a component of an illumination optical system that is low in manufacturing cost, provides high screen illuminance, and enables miniaturization of the projection type display apparatus. The dimension of the cell lenses of a second lens array is not uniform in one of the row direction and the column direction. Since the cell lenses are rectangular when viewed from the front side, the second lens array can be manufactured with a metal mold having a simple shape. The boundary lines between the cell lenses are straight and level differences at the boundary lines are small, sink marks of the second lens array are small, and the efficiency of utilization of light beams is high. Further, since the dimension of the cell lenses is not uniform in the other of the row direction and the column direction, the corresponding dimension of the second lens array can be reduced.

7 Claims, 7 Drawing Sheets

LENS SYSTEM FOR A PROJECTION DISPLAY APPARATUS IN WHICH LENSES ARE UNIFORM IN ONE DIRECTION AND NONUNIFORM IN ANOTHER

BACKGROUND OF THE INVENTION

1. Field of the Invention

The present invention relates to a projection type display apparatus that projects an image by inputting a light beam emitted from the light source to a spatial light modulation device that is also called a light valve.

2. Description of the Related Art

In recent years, projection type TV receivers, projector apparatuses, computer display devices, etc. that use, for example, a liquid crystal display panel that is a spatial light modulation device have spread. FIGS. 1A and 1B show, among those apparatuses, a rear projection type TV receiver using a liquid crystal display panel. This rear projection type TV receiver 11 incorporates a projection type display apparatus 13, a mirror 14, a screen 15, etc. in a cabinet 12. A light beam 16 that is output from the projection type display apparatus 13 is reflected by the mirror 14 and shines on the back surface of the screen 15, whereby a color or black-and-white image is displayed on the screen 15. Therefore a viewer views the image on the screen 15 from the front side of the screen 15.

FIGS. 2 and 3 show a color projection type display apparatus 13. In this projection type display apparatus 13, a light source 18 is detachably attached to an illumination optical system 17 and a rectangular-prism-shaped dichroic prism 21 is also attached to the illumination optical system 17. Red, green, and blue liquid crystal panels 22–24 are opposed to three side faces of the dichroic prism 21, respectively. In each of the liquid crystal display panels 22–24, a polarizer and an analyzer are disposed on the incidence side and the exit side of a liquid crystal cell. Spatial light modulation is performed in such a manner that each pixel of the liquid crystal cell selectively rotates the polarization plane of incident light in accordance with a video signal.

A projection lens 25, which is opposed to the remaining side face of the dichroic prism 21, is detachably attached to the illumination optical system 17. The projection lens 25 and the dichroic prism 21 have the liquid crystal display panels 22–24 and the screen 15 as conjugate points. The light source 18 has a parabolic mirror 18a and a lamp 18b that is disposed at the focal position of the parabolic mirror 18a. A metal halide lamp, a halogen lamp, or the like is used as the lamp 18b.

A filter 28, a lens array 29, and a polarization conversion device 32 are disposed in succession on the optical axis of the light source 18. The filter 28 passes only a light beam 27 in a visible range while interrupting unnecessary light beams in an infrared and ultraviolet ranges of a light beam 26 that is emitted from the light source 18. The lens array 29 is configured in such a manner that a plurality of convex cell lenses 29a are arranged in matrix form. For example, the polarization conversion device 32 converts the light beam 27 that is output from the lens array 29 and generally includes P-waves and S-waves in mixture into a light beam 31 having only P-waves by converting S-waves into P-waves.

In the polarization conversion device 32, a polarizing beam splitter passes P-waves while reflecting S-waves and a half-wave plate converts the reflected S-waves into P-waves. If the light beam 27 including P-waves and S-waves in mixture were input to the polarizers of the liquid crystal display panels 22–24, the S-waves of the light beam 27 would be interrupted by the polarizers and hence the light beam 27 would not be utilized effectively. In contrast, if the light beam 31 having only P-waves is input to the polarizers of the liquid crystal display panels 22–24, all of the light beam 31 passes through the polarizers and hence the light beam 31 is utilized effectively.

The incidence surface of a lens 33 is disposed in the vicinity of the focal plane of the image space of the lens array 29. The incidence surface of the lens 33 is formed with a lens array 34 in such a manner that a plurality of convex cell lenses 34a are arranged so as to correspond to the respective cell lenses 29a. The exit surface of the lens 33 is formed with a condenser lens 35 that has a single convex shape and condenses, onto the liquid crystal display panels 22–24, the light beam 31 that has passed through the lens array 34. A dichroic mirror 36 that reflects red light R and passes,green light G and blue light B, a dichroic mirror 37 that reflects the green light G and passes the blue light B, a relay lens 38, and a mirror 41 are disposed in succession downstream of the lens 33.

A mirror 42 and a condenser lens 43 are disposed on the optical path between the dichroic mirror 36 and the liquid crystal display panel 22. A condenser lens 44 is disposed on the optical path between the dichroic mirror 37 and the liquid crystal display panel 23. A relay lens 45, a mirror 46, and a condenser lens 47 are disposed on the optical path between the mirror 41 and the liquid crystal display panel 24. The liquid crystal display panels 22–24 are disposed on the focal planes of the image space of the lens array 34. The condenser lenses 43, 44, and 47 are disposed in the vicinity of the respective liquid crystal display panels 22–24.

The dichroic prism 21 is configured in such a manner that triangular-prism-shaped prisms 21A–21D made of plastics or glass are bonded together via optical thin films 21a and 21b. The optical thin film 21a reflects red light R and passes green light G and blue light B. The optical thin film 21b reflects blue light B and passes red light R and green light G. Therefore, the dichroic prism 21 outputs a light beam 16 in which a red image, a green image, and a blue image are combined together. The light beam 16 shines on the back surface of the screen 15 via the projection lens 25, whereby a color image is displayed on the screen 15.

FIGS. 4 and 5 show how green light G of the light beam 27 that has passed through the filter 28 travels. Red light R and blue light B travel in the same manner as the green light G though their optical paths are different from the optical path of the green light G. In the light source 18, the lamp 18b is disposed at the focal position of the parabolic mirror 18a. However, since the light emitting portion of the lamp 18b where arc discharge or the like occurs has a certain, limited size and hence the lamp 18b is not a complete point light source, not only light beams 27 shown in FIG. 4 that are parallel with the optical axis but also light beams 27 shown in FIG. 5 that are inclined with respect to the optical axis shine on the lens array 29.

As shown in FIG. 4, light beams 27 that are emitted from the light source 18 parallel with the optical axis and shine on the lens array 29 are converged by the respective cell lenses 29a at their focal positions.

However, the lens array 34 is disposed in the vicinity of the focal plane of the image space of the lens array 29 and the cell lenses 34a of the lens array 34 correspond to the respective cell lenses 29a of the lens array 29. Therefore, the light beams 27 that are emitted parallel with each other from the light source 18 and shine on the lens array 29 are converged at the central portions of the respective cell lenses 34a, and then condensed onto the liquid crystal display panel, 23 by the condenser lens 35 while receiving almost no lens action from the cell lenses 34a. The light beams 27 are condensed onto the input pupil E of the projection lens 25 by the condenser lens 44 that is disposed in the vicinity of the liquid crystal display panel 23.

On the other hand, as shown in FIG. 5, the lens array 34 has, as an object plane, a plane that is located in the vicinity of the lens array 29 that is illuminated with the light source 18, and the lens array 34 images this object plane onto the liquid crystal display panel 23. A light beam to shine on the liquid crystal display panel 23 enters the condenser lens 44 before shining on the liquid crystal display panel 23. However, since the condenser lens 44 is disposed in the vicinity of the liquid crystal display panel 23, the condenser lens 44 has almost no contribution to the above-described imaging relationship. The condenser lens 35 superimposes images formed by the respective cell lenses 34a one on another on the liquid crystal display panel 23.

The liquid crystal display panel 23 and the screen 15 are in a conjugate relationship having the projection lens 25 and the dichroic prism 21 as an imaging optical system. Therefore, a light beam that is emitted from the light source 18 and passes through the lens array 29, the lens 33, and the condenser lens 44 shines on the back surface of the screen 15 after being subjected to the spatial light modulation action of the liquid crystal display panel 23, and thereby causes an image to be displayed on the screen 15.

Incidentally, the intensity of the light beam 26 emitted from the light source 18 is highest on the optical axis and decreases as the position goes away from the optical axis. Therefore, with only the condenser lenses 35, 43, 44, 47, etc. each having a single convex shape, even a condensed light beam is given a non-uniform intensity profile and hence the illuminance profile on the screen 15 is not uniform. However, in the above-described projection type display apparatus 13, the uniformity of the illuminance profile on the screen 15 is improved because light beams that have been condensed by the cell lenses 29a and 34a of the lens arrays 29 and 34 are superimposed one on another on the screen 15.

FIG. 6A shows the lens array 29. As described above, the lens array 29 is configured in such a manner that a plurality of cell lenses 29a each having a convex shape are arranged in matrix form. The outer shape of each cell lens 29a is approximately similar to the effective opening of each of the liquid crystal display panels 22–24 and the screen 15. The ratio of the length of the horizontal side of each cell lens 29a to the length of its vertical side is 16:9, for example.

FIG. 6B shows a lens array 34 of a projection type display apparatus 13 of a first conventional example. This lens array 34 has the same shape as the lens array 29. In this lens array 34, arc images 48 that are carried by light beams 31 that are emitted from the light source 18 and shine on the lens array 34 via the cell lenses 29a of the lens array 29 are associated with the respective cell lenses 34a and isolated from each other.

FIG. 6C shows a lens array 34 of a projection type display apparatus 13 of a second conventional example. In this lens array 34, the cell lenses 34a are reduced in size from the cell lenses 29a in both of the row and column directions so that incident arc images 48 are associated with the respective cell lenses 34a and come closer to each other.

However, the projection type display apparatus 13 of the first conventional example using the lens array 34 shown in FIG. 6B is difficult to miniaturize because the lens array 34 has the same shape as the lens array 29 and hence is large in size. In contrast, the projection type display apparatus 13 using the lens array 34 of the second conventional example shown in FIG. 6C can be miniaturized because the cell lenses 34a are reduced in size from the cell lenses 29a in both of the row and column directions and hence the lens array 34 is small in size.

However, the projection type display apparatus 13 of the second conventional example using the lens array 34 shown in FIG. 6C is high in manufacturing cost because the lens array 34 has a complex shape and hence a metal mold for manufacture of the lens array 34 and the polarization conversion device 32 need to have complex shapes. Further, as is apparent from FIG. 6C, the boundary lines between the cell lenses 34a of the lens array 34 have curved portions. In addition, there is a boundary line surrounding one cell lens 34a whose one side is in contact with sides of boundary lines of a plurality of adjacent cell lenses 34a. Such a boundary line has large level differences. As a result, the formation performance of the lens array 34 is poor and hence large sink marks are prone to occur. Since the efficiency of utilization of the light beams 31 in the lens array 34 is low, the illuminance on the screen 15 is low.

To avoid reduction in the efficiency of utilization of the light beams 31 due to sink marks of the lens array 34, it is conceivable to increase the sizes of the respective cell lenses 34a so that sink marks are formed outside the effective portions of the respective cell lenses 34a. However, such a measure not only increases the size of the lens array 34, which in turn makes it difficult to miniaturize the projection type display apparatus, but also prevents increase of the efficiency of utilization of the light beams 31.

The present invention was motivated by a desire to overcome the above-mentioned disadvantages in the related art.

SUMMARY OF THE INVENTION

An object of the present invention is to provide a projection type display apparatus that is low in manufacturing cost, provides high screen illuminance, and can be miniaturized.

In a projection type display apparatus according to the invention, the dimension of the cell lenses of a second lens array is uniform in one of the row direction and the column direction and is not uniform in the other of the row direction and the column direction. Therefore, the cell lenses of the second lens array have rectangular shapes when viewed from the front side and hence can be manufactured with a metal mold having a simple shape. Further, the boundary lines between the cell lenses of the second lens array are straight and level differences at those boundary lines are small. Resulting high formation performance of the second lens array makes sink marks small, and hence the efficiency of utilization of a light beam is high in the second lens array.

Since the dimension of the cell lenses of the second lens array is uniform in one of the row direction and the column direction and is not uniform in the other, the dimension of the second lens array can be reduced in the row direction or the column direction in which the dimension of the cell lenses of the second lens array is not uniform.

In a projection type display apparatus according to the invention, a polarization conversion device is disposed in such a manner that the polarization conversion device and the second lens array or a first condenser lens are arranged in succession in the optical axis direction, and a spatial light modulation device modulates a light beam in accordance with its modulation state. This makes it possible to input, to the spatial light modulation device, in the form of only P-waves or S-waves, a light beam that is emitted from a light source, as well as to allow light beams that have been condensed by the first lens array to be input to the second lens array or the first condenser lens, to thereby reduce the degree of eclipse of the light beams. Therefore, the efficiency of utilization of the light beam emitted from the light source can be increased.

Since the boundary lines between the cell lenses of the second lens array are straight, the polarization conversion device can be made simple in structure even if the polarization conversion device and the second lens array are arranged in succession in the optical axis direction.

In a projection type display apparatus according to the invention, the cell lenses of the first lens array are decentered. Therefore, even if the dimension of the second lens array is small in the row direction or the column direction, light beams that have passed through the first lens array can efficiently be input to the second lens array.

Further, since the cell lenses of the second lens array are also decentered, even if light beams that are inclined from the optical axis are input to the second lens array, light beams that are parallel with the optical axis can be output from the second lens array and hence the light beams that have passed through the second lens array can efficiently be input to the first condenser lens.

In a projection type display apparatus according to the invention, the decentering values of the respective cell lenses of the first lens array are determined so that light beam images formed by the respective cell lenses of the first lens array become in close proximity to each other. Therefore, even in a case where light beams that have passed through the second lens array are input to a color separation dichroic mirror, the dispersion in the incident angles that those light beams form with the color separation dichroic mirror can be reduced.

In a projection type display apparatus according to the invention, since a color separation dichroic mirror is provided to which light beams are input in the direction in which the dimension of the cell lenses of the second lens array is not uniform, the dispersion in the incident angles that those light beams form with the color separation dichroic mirror n be reduced.

DETAILED DESCRIPTION OF THE PREFERRED EMBODIMENT

Figure 7:
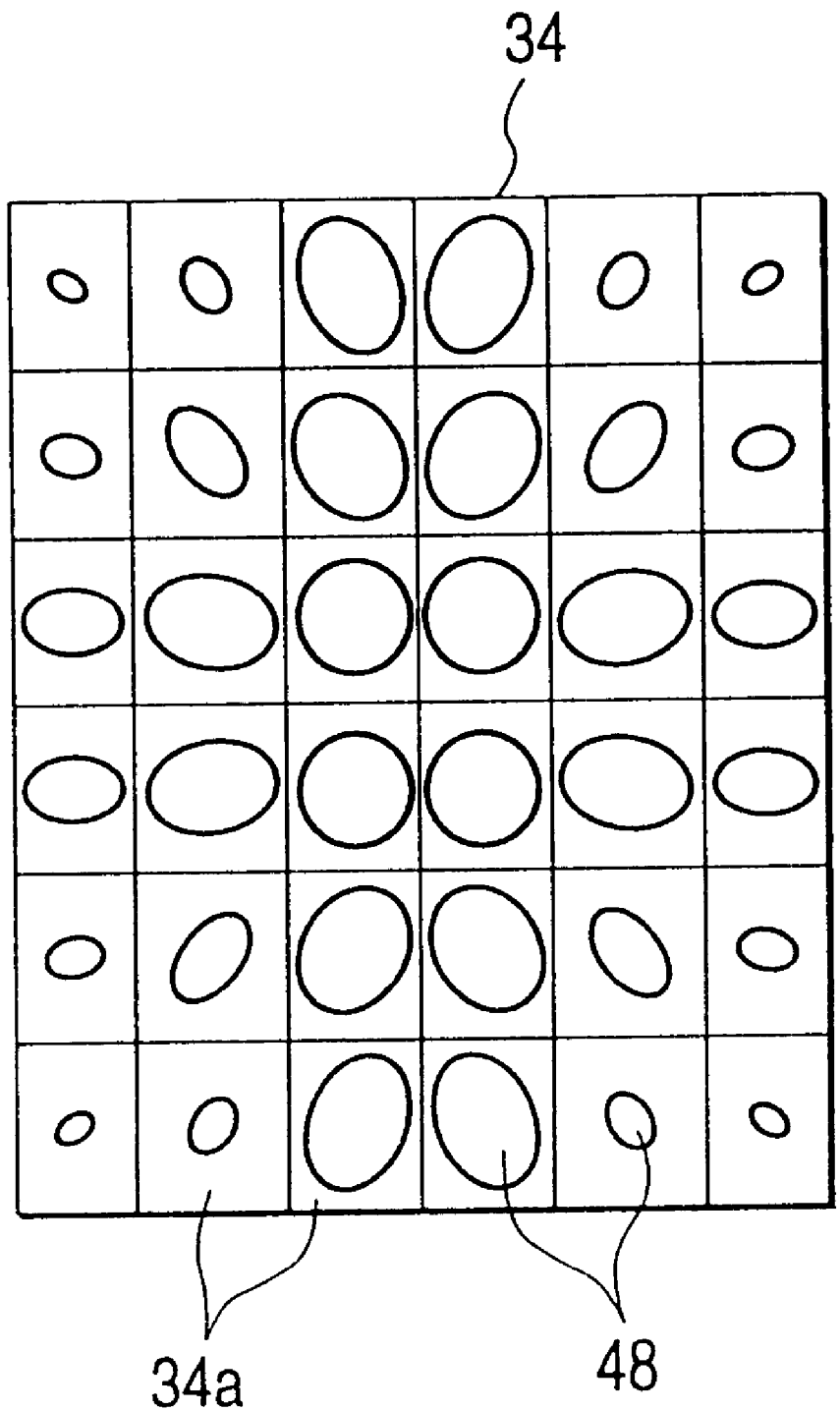
FIG. 7 is a front view of a second lens array according to an embodiment of the invention.

A color projection type display apparatus according to an embodiment of the present invention that is used in a rear projection type TV receiver will be hereinafter described with reference to FIG. 7. FIG. 7 shows a lens array 34 in the projection type display apparatus 13 according to the embodiment. The projection type display apparatus 13 according to the embodiment has the same configuration as the projection type display apparatuses 13 of the first and second conventional examples except for the lens array 34.

Figure 1A:
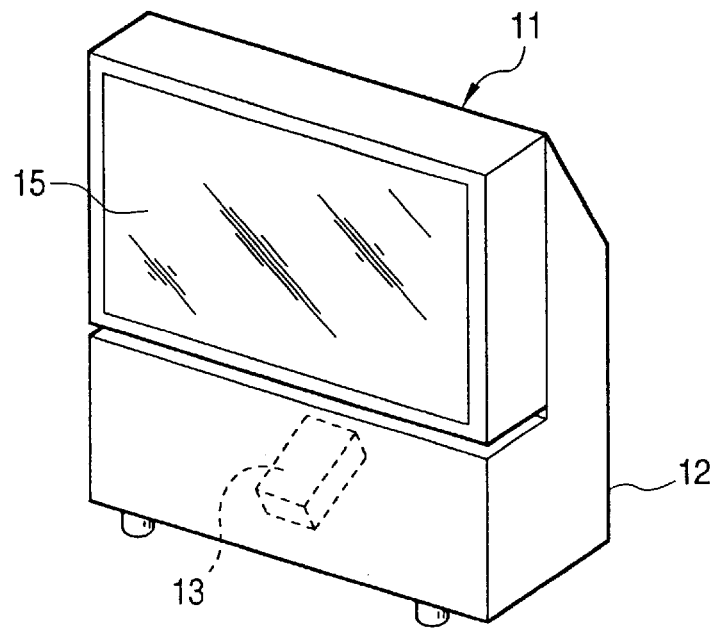
FIGS. 1A and 1B are a perspective view and a schematic side view, respectively, of a rear projection type TV receiver using a projection type display apparatus to which the present invention can be applied.
Figure 1B:
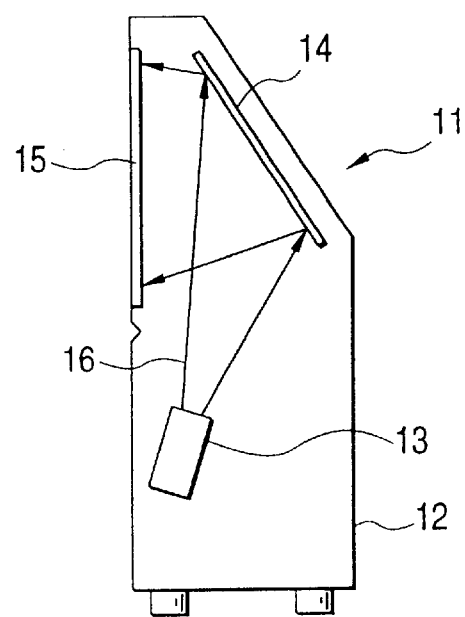
Figure 2:
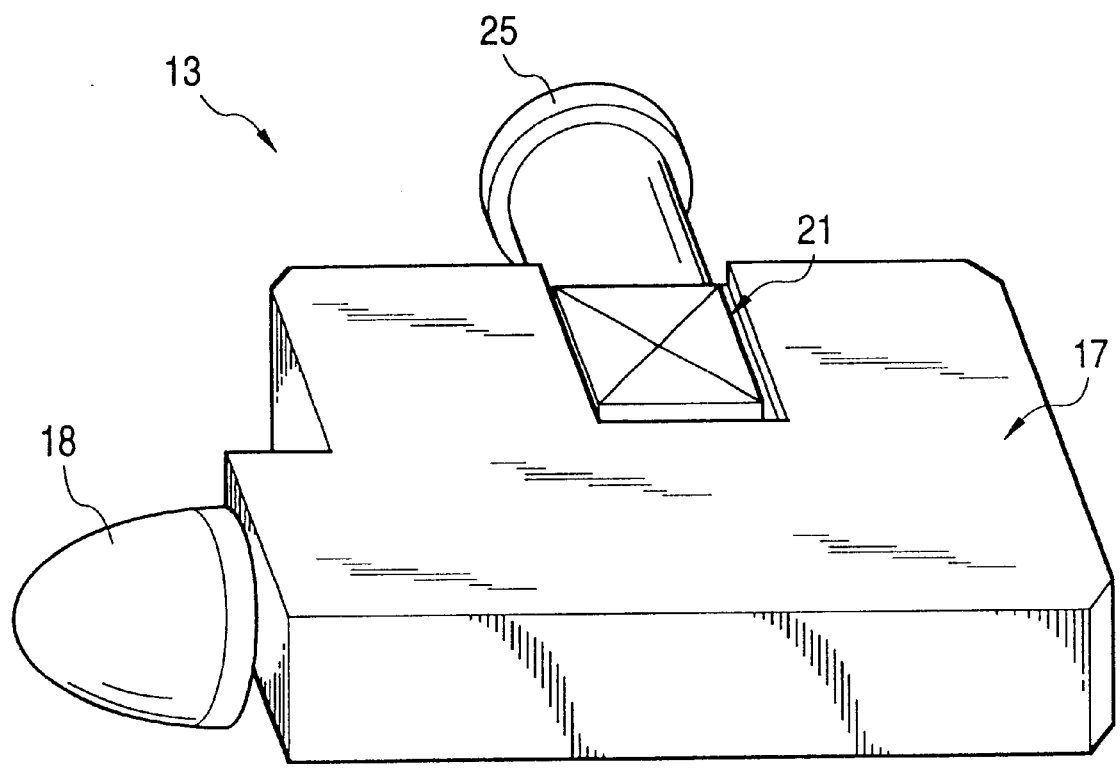
FIG. 2 is a perspective view of a projection type display apparatus to which the invention can be applied.
Figure 3:
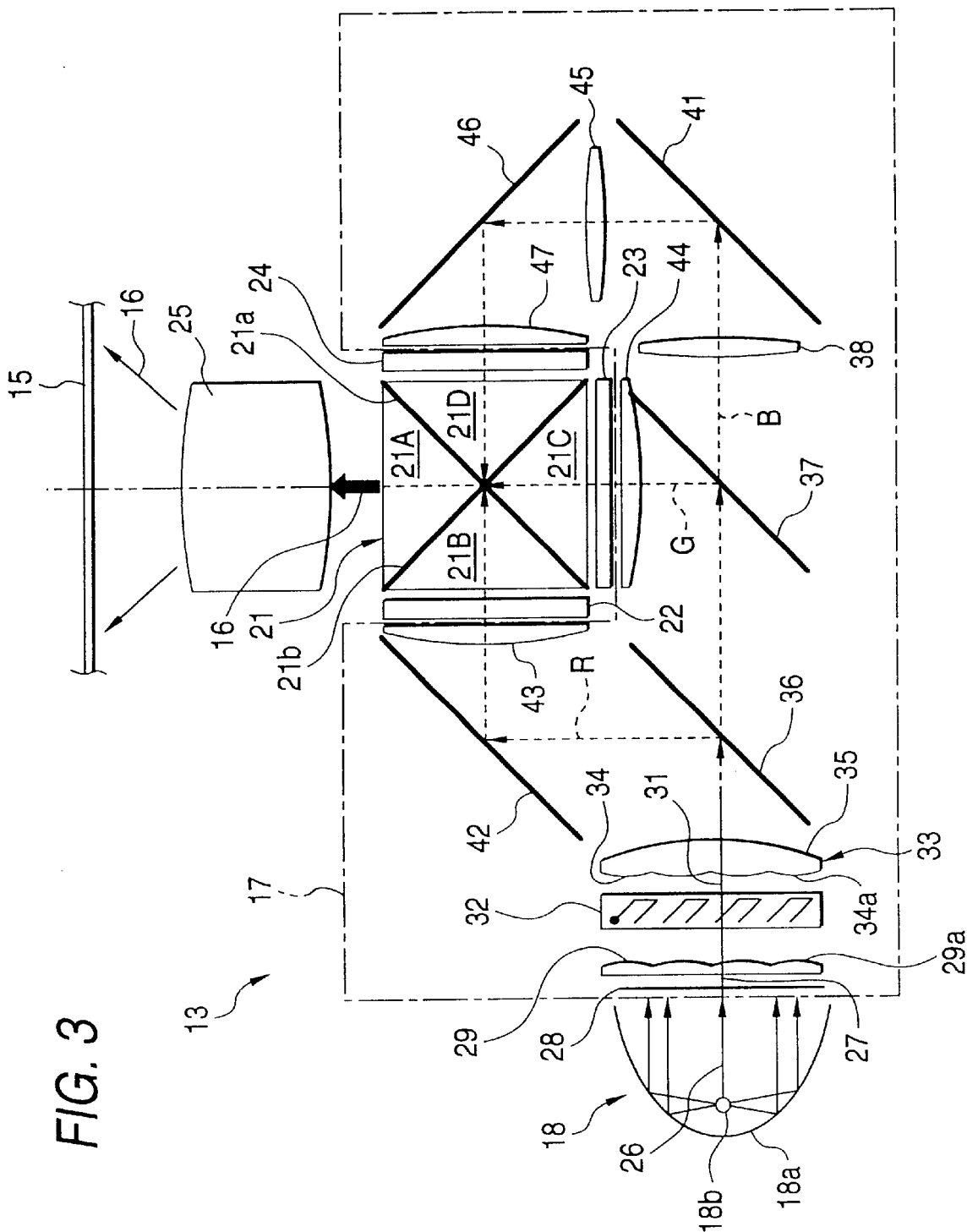
FIG. 3 is a schematic plan view of the projection type display apparatus of FIG. 2.
Figure 4:
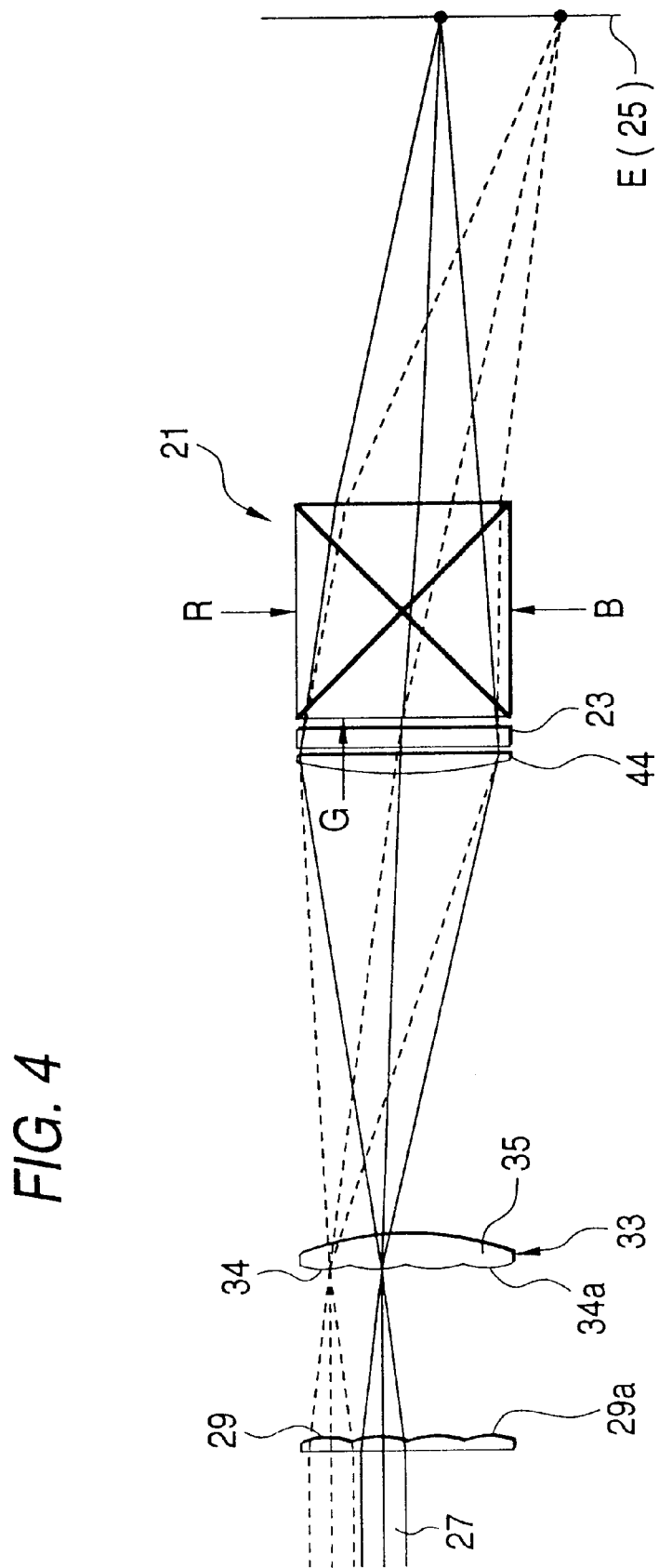
FIG. 4 is a side view showing a converging action of mainly a first lens array of the projection type display apparatus of FIG. 2.
Figure 5:
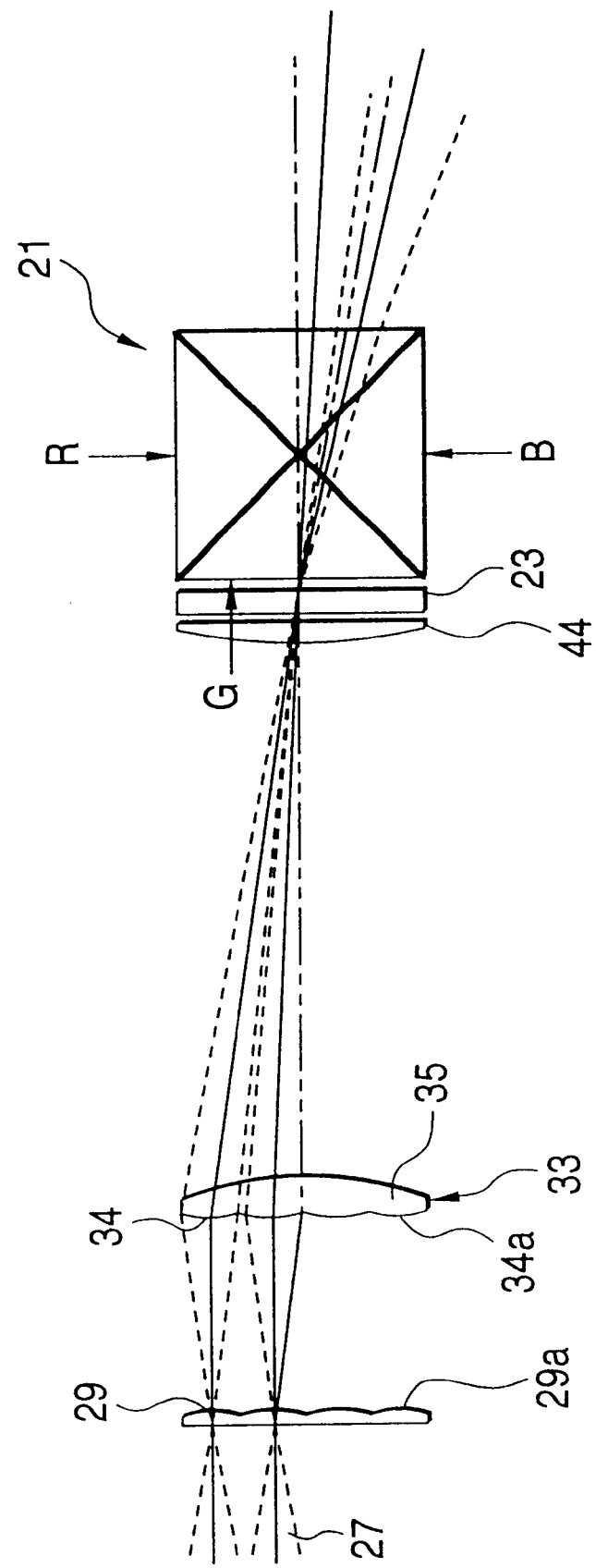
FIG. 5 is a side view showing a converging action of mainly a second lens array of the projection type display apparatus of FIG. 2.
Figure 6A:
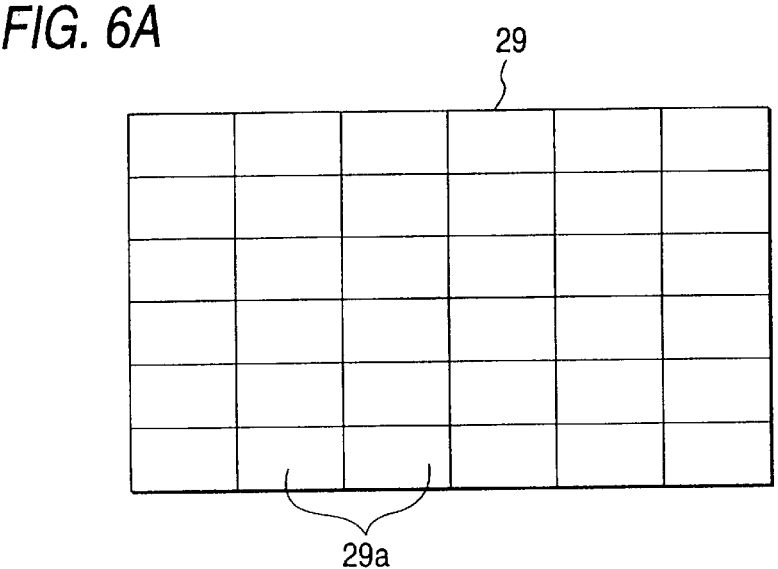
FIG. 6A is a front view of the first lens array of the projection type display apparatus of FIG. 2.
Figure 6B:
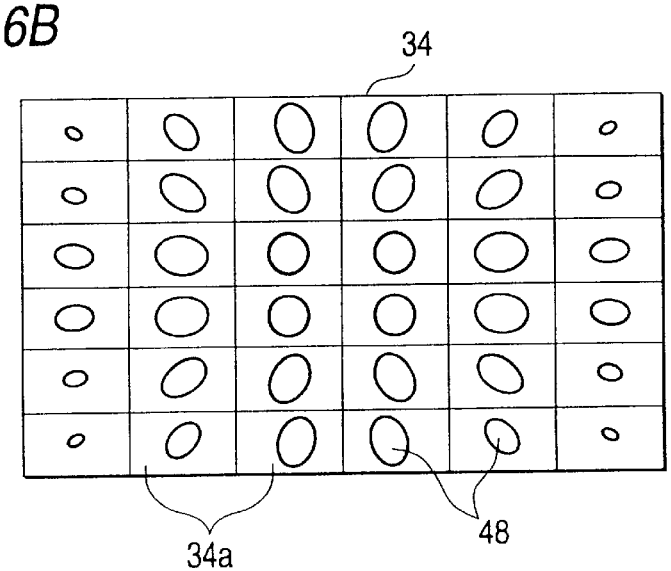
FIG. 6B is a front view of a second lens array of a projection type display apparatus of a first conventional example.
Figure 6C:
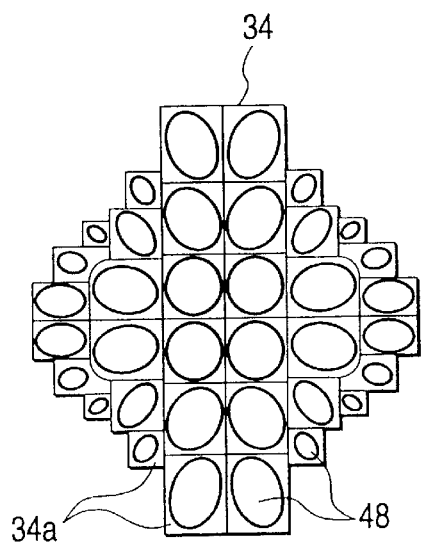
FIG. 6C is a front view of a second lens array of a projection type display apparatus of a second conventional example.

In the lens array 34 of the projection type display apparatus 13 according to the embodiment, in one of the row and column directions of the arrangement of the cell lenses 34a, the dimension of the cell lens 34a is uniform and equal to the dimension of the cell lenses 29a as in the case of the lens array 34 of the projection type display apparatus 13 of the first conventional example shown in FIG. 6B. However, in the other of the row and column directions of the arrangement of the cell lenses 34a, the dimension of the cell lenses 34a is not uniform and is set smaller than the dimension of the cell lenses 29a so that incident arc images 48 come closer to each other and those closest arc images 48 become in close proximity to each other.

It is desirable that the direction in which the dimension of the cell lenses 34a is reduced be the direction in which light beams are incident on the dichroic mirrors 36 and 37. For example, if the direction in which light beams are incident on the dichroic mirrors 36 and 37 is the longitudinal direction of the screen 15, it is desirable that the direction in which the dimension of the cell lenses 34a is reduced be the longitudinal direction of the screen 15. With this measure, in spite of the fact that the color separation characteristics of each of the dichroic mirrors 36 and 37 depend on the light beam incident angle, an image having high color uniformity can be displayed on the screen 15 by virtue of small dispersion of the incident angle.

It is desirable that the cell lenses 29a of the lens array 29 be decentered so that arc images 48 that are incident on the lens array 34 come closer to each other and those closest arc images 48 become in close proximity to each other as described above. In this case, light beams 31 obliquely shine on the cell lenses 34a of the lens array 34. Therefore, to cause the light beams 31 to exit from the lens array 34 parallel with the optical axis, it is desirable that also the cell lenses 34a of the lens array 34 be decentered.

Although the polarization conversion device 32 is used in the projection type display apparatus 13 of the above embodiment, the polarization conversion device 32 is not always necessary. Further, although the lens array 34 and the condenser lens 35 form the integral lens 33 in the projection type display apparatus 13 of the above embodiment, the lens array 34 and the condenser lens 35 may be provided separately from each other. In this case, the polarization conversion device. 32 can be disposed between the lens array 34 and the condenser lens 35.

Although in the above embodiment the invention is applied to the color projection type display apparatus 13, the invention can also be applied to a black-and-white projection type display apparatus. In this case, the dichroic prism 21, the dichroic mirrors 36 and 37, etc. are not necessary. Further, although in the above embodiment the invention is applied to the projection type display apparatus 13 that is used in a rear projection type TV receiver, the invention can also be applied to a projection type display apparatus that is used in a front projection type TV receiver, a projector apparatus, a computer display device, etc.

As described above, in the projection type display apparatus according to the invention, since the second lens array can be manufactured with a metal mold having a simple shape, its manufacturing cost can be reduced. The efficiency of utilization of light beams is high in the second lens array, and hence the illuminance on the screen can be increased. Further, since the dimension of the second lens array can be reduced, the projection type display apparatus can be miniaturized.

In the projection type display apparatus according to the invention, a light beam that is emitted from the light source can be input to the spatial light modulation device in the form of only P-waves or S-waves and the efficiency of utilization of the light beam emitted from the light source is high. Therefore, the illuminance on the screen can further be increased. Further, since the polarization conversion device can be made simple in structure, related increase in manufacturing cost is small though the illuminance on the screen is increased.

In the projection type display apparatus according to the invention, light beams that have passed through the first lens array can efficiently be input to the second lens array, and light beams that have passed through the second lens array can efficiently be input to the first condenser lens. Therefore, the illuminance on the screen can further be increased.

In the projection type display apparatus according to the invention, even in a case where light beams that have passed through the second lens array are input to a color separation dichroic mirror, the dispersion in the incident angles that those light beams form with the color separation dichroic mirror can be reduced. This makes it possible to display an image that is high in color uniformity.

In the projection type display apparatus according to the invention, since the dispersion in the incident angles that light beams form with the color separation dichroic mirror is small, an image that is high in color uniformity can be displayed.

What is claimed is:

1. A projection display apparatus comprising:
   a light source for emitting a light beam;
   a spatial light modulation device;
   an illumination optical system to which the light beam emitted from the light source is input, the illumination optical system including:
      a first lens array having a plurality of first cell lenses that are arranged in matrix form having columns and rows;
      a second lens array disposed on an image side of the first lens array and having a plurality of rectangular second cell lenses that are arranged in matrix form having columns and rows so as to correspond to the respective first cell lenses of the first lens array, wherein
         each matrix cell column contains an equal number of rectangular cell lenses;
         each matrix cell row contains an equal number of rectangular cell lenses;
         corresponding horizontal boundaries of each cell lens within any matrix cell row are collinear;
         corresponding vertical boundaries of each cell lens within any matrix cell column are collinear;
         one of a matrix cell column width and a matrix cell row height is constant; and
         an other of the matrix cell column width and the matrix cell row height is variable;
      a first condenser lens for condensing light beams that have passed through the second lens array onto the spatial light modulation device;
      a second condenser lens disposed on an object side of the spatial light modulation device; and
      a projection lens to which a light beam that has been modulated by the spatial light modulation device is input.

2. The projection type display apparatus according to claim 1, further comprising a polarization conversion device disposed so that the polarization conversion device and one of the second lens array and the first condenser lens are arranged in succession in an optical axis direction, wherein the spatial light modulation device modulates a light beam that has been passed through the illumination optical systems in accordance with a polarization state provided by the polarization conversion device.

3. The projection type display apparatus according to claim 2, wherein the polarization conversion device is disposed between the second lens array and the first condenser lens.

4. The projection type display apparatus according to claim 1, wherein the cell lenses of each of the first and second lens arrays are decentered.

5. The projection type display apparatus according to claim 1, wherein decentering values of the respective first cell lenses of the first lens array are determined so that light beam images formed by the respective first cell lenses to the first lens array are in close proximity to each other.

6. The projection type display apparatus according to claim 1, further comprising a color separation dichroic mirror to which the light beam is input in a direction in which one of the row-direction dimension and the column-direction dimension of the second cell lenses of the second lens array is not uniform.

7. The projection type display apparatus according to claim 1, further comprising a color separation dichroic mirror to which the light beams are input in the variable direction.

* * * * *